(12) United States Patent
Chen

(10) Patent No.: US 10,951,120 B2
(45) Date of Patent: Mar. 16, 2021

(54) FLYBACK CONVERTER, CONTROL CIRCUIT AND CONTROL METHOD THEREFOR

(71) Applicant: Silergy Semiconductor Technology (Hangzhou) LTD, Hangzhou (CN)

(72) Inventor: Huiqiang Chen, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/362,852

(22) Filed: Mar. 25, 2019

(65) Prior Publication Data
US 2019/0222124 A1 Jul. 18, 2019

Related U.S. Application Data

(63) Continuation-in-part of application No. 15/140,540, filed on Apr. 28, 2016, now Pat. No. 10,298,136.

(30) Foreign Application Priority Data

Apr. 28, 2015 (CN) .............................. 20150207749.8

(51) Int. Cl.
*H02M 3/335* (2006.01)
*H02M 1/15* (2006.01)
(Continued)

(52) U.S. Cl.
CPC ......... *H02M 3/33515* (2013.01); *H02M 1/15* (2013.01); *H02M 3/33523* (2013.01); *H02M 1/14* (2013.01); *H02M 2001/0032* (2013.01)

(58) Field of Classification Search
CPC ......... H02M 3/33515; H02M 3/33523; H02M 1/15; H02M 1/14; H02M 2001/0032
(Continued)

(56) References Cited

U.S. PATENT DOCUMENTS 8,018,743 B2 * 9/2011 Wang ................ H02M 3/33507
323/284
8,199,539 B2 6/2012 Wang et al.
(Continued)

FOREIGN PATENT DOCUMENTS

| CN | 103944374 A | 7/2014 |
| CN | 104767372 A | 7/2015 |
| CN | 104779804 A | 7/2015 |

OTHER PUBLICATIONS

Received STIC search report from EIC 2800 searcher John Digeronimo dated Nov. 12, 2019. (Year: 2019).*
(Continued)

*Primary Examiner* — Shawki S Ismail
*Assistant Examiner* — Htet Z Kyaw
(74) *Attorney, Agent, or Firm* — Michael C. Stephens, Jr.

(57) ABSTRACT

The disclosure relates to a flyback converter, a control circuit and a control method therefor. In the control method, a power stage circuit is controlled at a light load to operate alternatively in a pulse-width modulation mode (e.g., a constant switching frequency mode) and in a constant on time mode, in accordance with a voltage compensation signal. Thus, output energy may decrease rapidly and smoothly, without need for the control circuit to stop working. The flyback converter has increased efficiency at the light load and decreased output voltage ripple.

19 Claims, 12 Drawing Sheets

(51) Int. Cl.
*H02M 1/00* (2006.01)
*H02M 1/14* (2006.01)

(58) Field of Classification Search
USPC ........................................... 363/21.13
See application file for complete search history.

(56) References Cited

U.S. PATENT DOCUMENTS

| | | | |
|---|---|---|---|
| 8,213,203 B2 | 7/2012 | Fei et al. | |
| 8,472,214 B2* | 6/2013 | Huang | H02M 3/33523 363/21.18 |
| 8,531,853 B2 | 9/2013 | Baurle et al. | |
| 9,041,377 B2 | 5/2015 | Wang et al. | |
| 9,379,624 B2 | 6/2016 | Lin et al. | |
| 9,584,025 B2 | 2/2017 | Lin et al. | |
| 9,602,000 B2 | 3/2017 | Teh | |
| 9,654,013 B2 | 5/2017 | Chen et al. | |
| 9,812,973 B2 | 11/2017 | Baurle et al. | |
| 2008/0084713 A1* | 4/2008 | Baurle | H02M 3/33515 363/21.01 |
| 2008/0088292 A1 | 4/2008 | Stoichita et al. | |
| 2009/0284994 A1 | 11/2009 | Lin et al. | |
| 2010/0008110 A1* | 1/2010 | Huang | H02M 3/33523 363/21.18 |
| 2010/0164455 A1 | 7/2010 | Li et al. | |
| 2010/0208500 A1 | 8/2010 | Yan et al. | |
| 2010/0225293 A1 | 9/2010 | Wang et al. | |
| 2011/0110126 A1 | 5/2011 | Morrish | |
| 2011/0234188 A1 | 9/2011 | Chiu et al. | |
| 2011/0273910 A1* | 11/2011 | Baurle | H02M 3/33515 363/21.01 |
| 2011/0286248 A1* | 11/2011 | Wang | H02M 3/33507 363/21.18 |
| 2011/0316518 A1 | 12/2011 | Feng et al. | |
| 2012/0320634 A1* | 12/2012 | Baurle | H02M 3/33515 363/21.01 |
| 2013/0051089 A1 | 2/2013 | Pan et al. | |
| 2014/0062434 A1 | 3/2014 | Ouyang | |
| 2014/0159689 A1 | 6/2014 | Chen | |
| 2014/0301115 A1* | 10/2014 | Baurle | H02M 3/33507 363/21.13 |
| 2014/0328090 A1* | 11/2014 | Takahashi | H02M 3/33546 363/21.17 |
| 2015/0180341 A1 | 6/2015 | Yuan | |
| 2015/0311810 A1 | 10/2015 | Chen et al. | |
| 2015/0362937 A1 | 12/2015 | Wang | |
| 2016/0043649 A1 | 2/2016 | Fang et al. | |
| 2016/0044759 A1 | 2/2016 | Lai et al. | |
| 2016/0156273 A1* | 6/2016 | Baurle | H02M 3/33507 363/21.13 |
| 2016/0294278 A1 | 10/2016 | Li et al. | |
| 2016/0301407 A1 | 10/2016 | Chen et al. | |
| 2018/0026542 A1* | 1/2018 | Baurle | H02M 3/33507 363/21.13 |
| 2019/0140545 A1* | 5/2019 | Baurle | H02M 3/33507 |

OTHER PUBLICATIONS

Received STIC search report from EIC 2800 searcher Steve Chung dated Jul. 11, 2019. (Year: 2019).*
See attached NPL search history with IP.com. (Year: 2020).*

* cited by examiner

US 10,951,120 B2

FLYBACK CONVERTER, CONTROL CIRCUIT AND CONTROL METHOD THEREFOR

CLAIM OF PRIORITY

This application is a continuation-in-part of U.S. patent application Ser. No. 15/140,540, filed on Apr. 28, 2016, which is hereby incorporated by reference as if it is set forth in full in this specification, and which also claims priority to Chinese Application No. 201510207749.8, filed on Apr. 28, 2015, which is hereby incorporated by reference.

BACKGROUND OF THE DISCLOSURE

The disclosure relates to the field of power electronics, and more particularly, to a flyback converter, a control circuit and a control method therefor.

FIELD OF THE DISCLOSURE

A flyback converter has low conversion efficiency at a light load. Thus, when designing a flyback converter, a control method at a light load may be different for improving conversion efficiency.

In a conventional flyback converter, the control method may be constant on time control at the light load. In the control method, a switching control signal has a constant on time period in each switching cycle, for a relatively long time period within the switching cycle and which may be chosen by a user. A switching frequency will be changed when an off time period is changed for providing desired output power. However, a peak current will decrease at a light load, which causes a switching frequency to decrease. The losses relevant to the switching frequency, such as losses of an output capacitance and gate charges of a power MOSFET, and a leakage inductance loss, will be reduced. Typically, an on time period may have a minimum value, i.e. a minimum on time period, so that output energy is controlled and efficiency is increased.

Nevertheless, electric energy is transferred with an amount larger than that is output, in some cases when the control method is performed in a constant on time mode at a light load. Consequently, an output voltage increases. In view of this, the flyback converter may be controlled to stop working for a time period, when the output voltage is detected to be overvoltage, i.e. a voltage feedback signal $V_{FB}$ larger than VOVP. The flyback converter then continues to work. It decreases electric energy having been transferred from the power stage, and ensures that a constant output voltage is provided at the light load. The control circuit stops working for a time period so that a switching control signal Q maintains to be invalid for a time period, until the voltage falls below a predetermined value, as shown in FIG. 1. In the time period, electric energy is output from an output capacitor of the power stage circuit. The output capacitor is typically an electrolytic capacitor, having large voltage ripple. Consequently, the output voltage has large ripple too.

BRIEF DESCRIPTION OF THE DRAWINGS

The above and other objects, advantages and features of the present invention will become more fully understood from the detailed description given hereinbelow in connection with the appended drawings, and wherein.

DETAILED DESCRIPTION OF EMBODIMENTS OF THE DISCLOSURE

Reference will now be made in detail to particular embodiments of the disclosure, it will be understood that the scope of the present invention is not limited to these embodiments. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, and circuits have not been described in detail so as not to unnecessarily obscure aspects of the present invention.

Furthermore, it will be understood by one skilled in the art that attached drawings are to be regard as illustrative, and may not be drawn to scale.

Also, it will be understood in the following description that the term "circuit" refers to a conductive loop consisting of at least one component or sub-circuit which are electrically coupled or electromagnetically coupled to each other. When one component/circuit is referred to as being "connected to" another component, or one component/circuit is referred to as being "connected between" two nodes, it can be connected to or coupled to another component directly or with an intermediate component therebetween. The connection of two components can be physical or logical connection, or physical and logical connection. On the contrary, when one component is referred to as being "coupled directly to" or "connected directly to" another component, there will be no an intermediate component between two components.

Where the term "comprising" or "including" is used in the present description and claims, it does not exclude other elements or steps, unless something otherwise is specifically stated. That is, it means "including, but not limited to".

In the following description that the terms such as "first", "second" and the like are used herein for purposes of description and are not intended to indicate or imply relative importance or significance. The term "plurality", as used herein, is defined as two or more than two, unless something otherwise is specifically stated.

Figure 1:
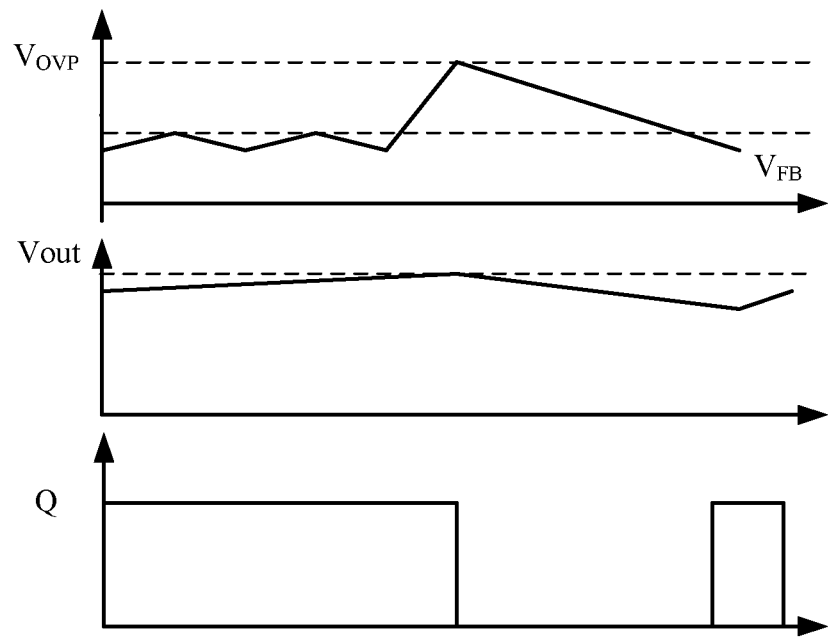
FIG. 1 is an operating waveform diagram of an example flyback converter according to the prior art.
Figure 2:
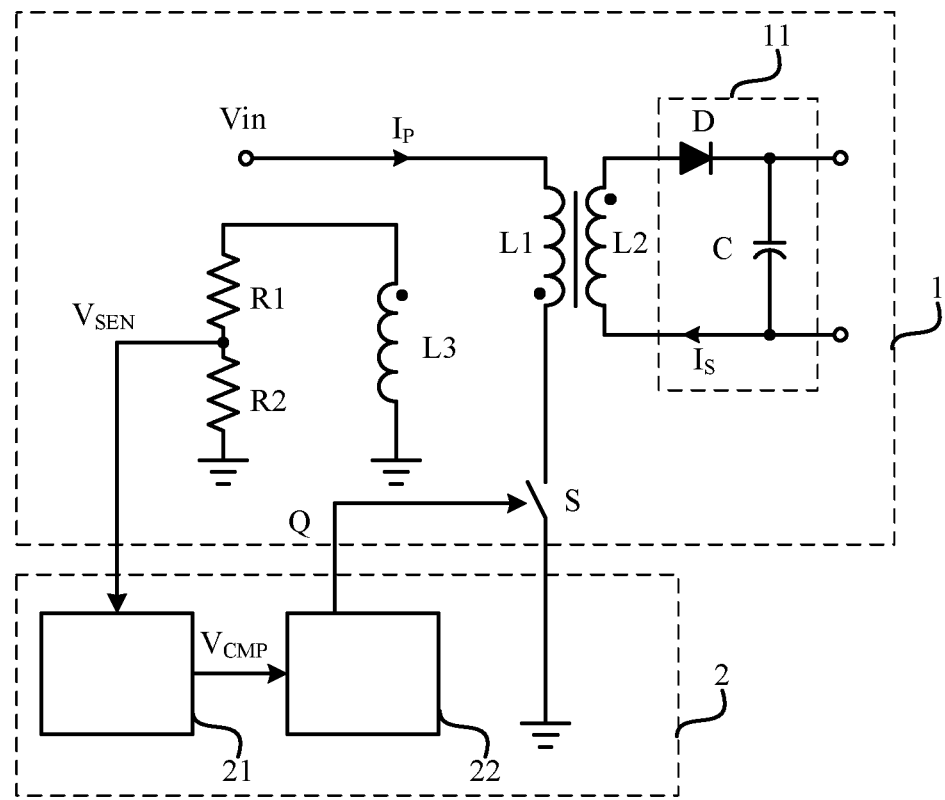
FIG. 2 is a schematic circuit diagram of an example flyback converter according to an embodiment of the present disclosure.

FIG. 2 is a schematic circuit diagram of an example flyback converter according to an embodiment of the present disclosure. As shown in FIG. 2, the switching converter according to an embodiment of the present disclosure includes a power stage circuit 1 and a control circuit 2. As shown in FIG. 2, the power stage circuit 1 has a flyback topology structure, including a primary winding L1 and a power switch S being coupled in series between a voltage input terminal Vin and the ground, a secondary winding L2 being coupled to the primary winding L1, and a secondary rectifier circuit 11 coupled to the secondary winding L2. The power stage circuit 1 further includes an auxiliary winding L3 and division resistors R1 and R2 for dividing a voltage across the secondary winding. The secondary winding L3 is coupled to the primary winding L1. A voltage sampling signal $V_{SEN}$ across two ends of the auxiliary winding L3 is used for obtaining output voltage information of the power stage circuit 1, a time point when a current of the secondary winding L2 crosses zero, and a time point when the current reaches a valley bottom. Accordingly, the above information can be obtained by sampling a voltage across the auxiliary winding L3 after voltage division and the power switch S can be controlled according to the information. It should be understood that the power stage circuit according to the embodiment of the present disclosure is not limited to a flyback converter with primary-side feedback, but includes other types of flyback converters. In this embodiment, the flyback converter is described as being a power factor correction (PFC) circuit to provide a constant output voltage.

The control circuit 2 generates a switching control signal Q for turning on or off the power switch S according to feedback parameters of the power stage circuit 1. The control circuit 2 comprises a compensation generating circuit 21 and a control signal generating circuit 22.

The compensation circuit 21 generates a voltage compensation signal $V_{CMP}$. The voltage compensation signal represents a difference between an output voltage $V_{OUT}$ of the power stage circuit 1 and a reference voltage $V_{REF}$. The voltage compensation signal $V_{CMP}$ represents deviation of a current output voltage from a desired value, with a large value to indicate a large deviation extent.

The control signal generating circuit 22 generates a switching control signal Q in a pulse width modulation mode in a case that the voltage compensation signal $V_{CMP}$ is within a first range, and to generate a switching control signal Q in a constant on time mode in a case that the voltage compensation signal $V_{CMP}$ is within a second range. In the pulse width modulation mode, switching cycle is constant and a duty cycle is varied. In the constant on time mode, an on time period is constant and an off time period of a switching frequency is varied. The switching control signal Q is used for turning on or off the power switch S. A minimum value of the first range is equal to a maximum value of the second range. That is, the control signal generating circuit 22 switches from the pulse width modulation mode to the constant on time mode when the voltage compensation signal $V_{CMP}$ decreases from the first range to the second range.

Figure 3:
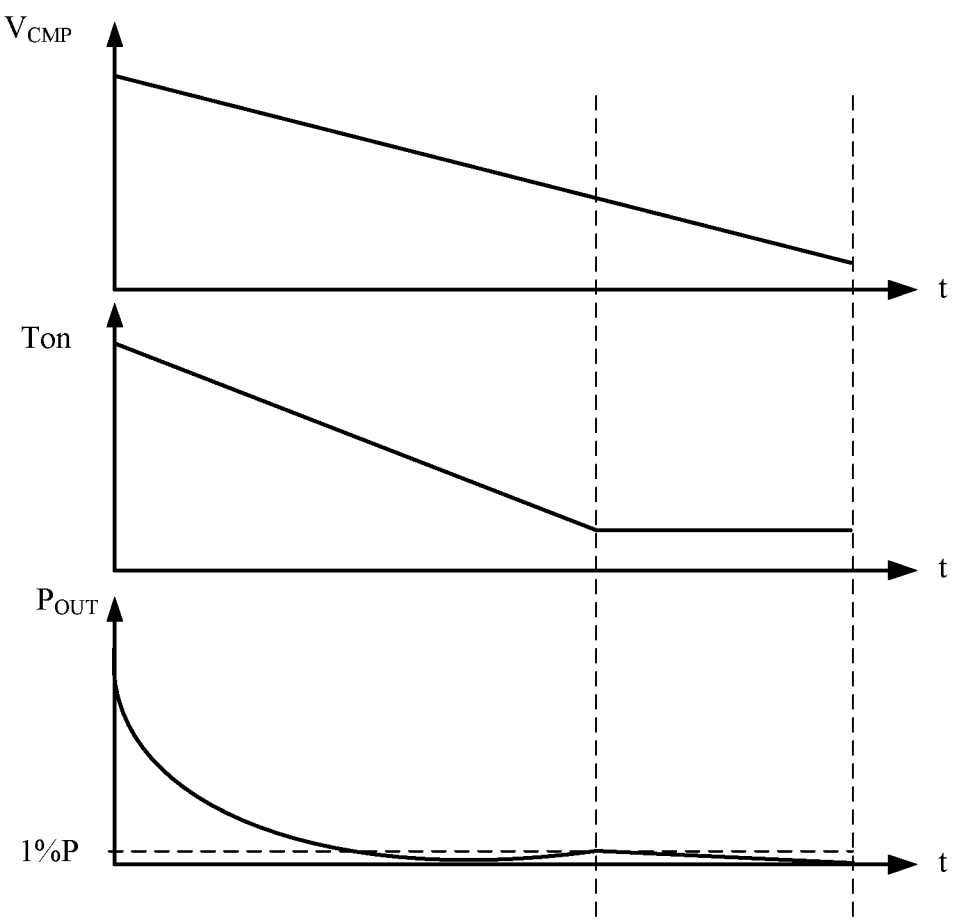
FIG. 3 shows variation of output power of an example flyback converter according to an embodiment of the present disclosure.

FIG. 3 shows variation of output power of an example flyback converter according to an embodiment of the present disclosure. As shown in FIG. 3, in the pulse width modulation mode in which the switching cycle is constant and the on time period is varied, the power stage circuit 1 has output power Pour which varies faster than the voltage compensation signal $V_{CMP}$. That is, the output power varies with a square of the on time period. Even in a case that the voltage compensation signal $V_{CMP}$ decreases slightly, output energy will decrease greatly. The output power which increases due to the light load will then decreases rapidly. As a comparison, the output power varies nearly linearly with the voltage compensation signal in the constant on time mode. That is, the output power varies linearly with the frequency. After the output power is adjusted rapidly, the constant on time mode will increase efficiency at the light load. Thus, two modes may be mixed to maintain efficiency at the light load while performing rapid adjustment of the output power, without need for a conventional control method which have large output voltage ripple.

Figure 4:
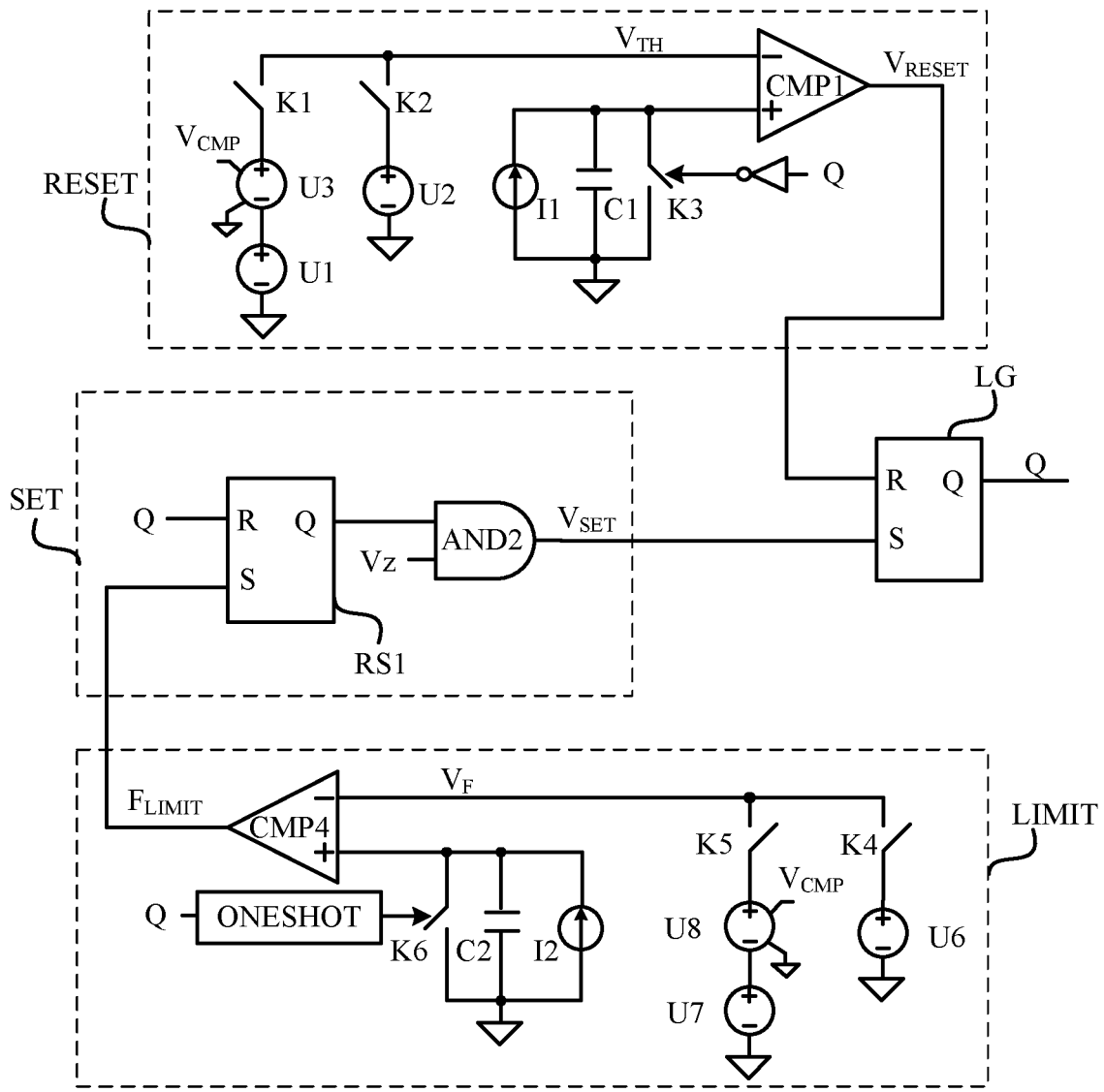
FIG. 4 is a schematic circuit diagram of a control signal generating circuit according to a first embodiment of the present disclosure.

FIG. 4 is a schematic circuit diagram of a first control signal generating circuit according to another embodiment of the present disclosure. As shown in FIG. 4, the control signal generating circuit 22 includes a reset signal generating circuit RESET, a frequency limiting signal generating circuit LIMIT, a set signal generating circuit SET and a logic circuit LG.

The reset signal generating circuit RESET generates a reset signal $V_{RESET}$ in accordance with the voltage compensation signal $V_{CMP}$ in a case that the voltage compensation signal $V_{CMP}$ is within the first range, and generates a reset signal $V_{RESET}$ in a constant on time mode in a case that the voltage compensation signal $V_{CMP}$ is within the second range. That is, the reset signal generating circuit RESET generates a reset signal $V_{RESET}$ in the pulse width modulation mode when the voltage compensation signal $V_{CMP}$ is relatively high, and generates a reset signal $V_{RESET}$ in a constant on time mode when the voltage compensation signal $V_{CMP}$ is relatively low.

Specifically, the reset signal generating circuit RESET includes voltage sources U1 and U2, a controlled voltage source U3, switches K1 and K2, a current source IL a charging capacitor C1, a switch K3 and a comparator CMP1.

The voltage source U1, the controlled voltage source U3 and the switch K1 are connected in series between an inverting input terminal of the comparator CMP1 and the ground. The voltage source U1 outputs a predetermined constant voltage, and the controlled voltage source U3 outputs a voltage proportional to the voltage compensation signal $V_{CMP}$. The switch K1 is controlled by the control signal V1, and is turned on when the voltage compensation voltage $V_{CMP}$ is within the first range, and is turned off when the voltage compensation signal $V_{CMP}$ is not within the first range.

Figure 5:
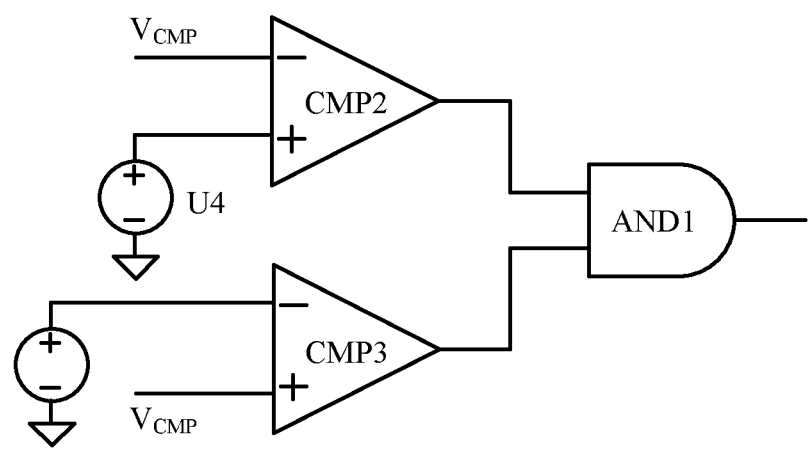
FIG. 5 is a schematic circuit diagram of an example condition detection circuit according to an embodiment of the present disclosure.

The control signal V1 may be generated by a condition detect circuit as shown in FIG. 5. As shown in FIG. 5, the condition detection circuit includes a comparator CMP3, a logic gate AND1, and voltage sources U4 and U5. The voltage source U4 is connected between a non-inverting input terminal of the comparator CMP2 and the ground. The voltage source U5 is connected between an inverting input terminal of the comparator CMP3 and the ground. The comparator CMP2 receives the voltage compensation signal $V_{CMP}$ at the inverting input terminal. The comparator CMP3 receives the voltage compensation signal $V_{CMP}$ at the non-inverting input terminal Output terminals of the comparators CMP2 and CMP3 are connected to an input terminal of the logic gate AND1. An output terminal of the logic gate AND1 provides a control signal Vn. The voltage source U4 limits a maximum value of the voltage range, and the voltage source U5 limits a minimum value of the voltage range. The condition detection circuit outputs a high-level signal when the voltage compensation signal is smaller than the maximum value and larger than the minimum value, i.e. within the specific range.

The voltage source U2 and the switch K2 are connected in series between an inverting input terminal of the comparator CMP1 and the ground. The voltage source U2 outputs a predetermined constant voltage. The switch K2 is controlled by a control signal V2, and is turned on when the voltage compensation voltage $V_{CMP}$ is within the second range, and is turned off when the voltage compensation signal $V_{CMP}$ is not within the second range. The control signal V2 may also be generated by the condition detect circuit as shown in FIG. 5, the detailed description of which is omitted.

The current source I1, the charging capacitor C1 and the switch K3 are connected in parallel between the non-inverting input terminal of the comparator CMP1 and the ground. The switch K3 are controlled to be turned on and off according to the inverting signal of the switching control signal Q, that is, the switch K3 is turned off as the power switch S is turned on, and is turned on as the power switch S is turned off. When the switch K3 is turned off, the current source I1 charges the charging capacitor C1 so that a voltage at the non-inverting terminal increases in a predetermined slope. When the switch K3 is turned on, two terminals of the charging capacitor C1 are shorted, and the charging capacitor C1 is discharged so that the voltage at the non-inverting terminal changes to be zero in a short time. Thus, the voltage at the non-inverting terminal increases when the power switch S is turned on, and reaches a threshold $V_{TH}$ after a time period $T_{ON}$ so that the reset signal $V_{RESET}$ from the comparator CMP1 reverses. The time period $T_{ON}$ is an on time period of the power switch S, which is a time period from a time point that the set signal $V_{SET}$ is set to be valid to a time point that the reset signal $V_{RESET}$ is set to be valid.

When the voltage compensation signal $V_{CMP}$ is within the first range, the switch K1 is turned on and the switch K2 is turned off. The threshold $V_{TH}$ is a parameter relevant to the voltage compensation signal $V_{CMP}$. Thus, the on time period $T_{ON}$ of the power switch varies with the voltage compensation signal $V_{CMP}$.

When the voltage compensation signal $V_{CMP}$ is within the second range, the switch K1 is turned off and the switch K2 is turned on. The threshold $V_{TH}$ is a constant value. Thus, the on time period $T_{ON}$ of the power switch is constant.

The frequency limiting signal generating circuit LIMIT generates a frequency limiting signal $F_{LIMIT}$ having a predetermined invalid zone in a case that the voltage compensation signal $V_{CMP}$ is within the first range, and generates a frequency limiting signal $F_{LIMIT}$ having an invalid zone which varies in accordance with the voltage compensation signal $V_{CMP}$ in a case that the voltage compensation signal $V_{CMP}$ is within the second range. The frequency limiting signal $F_{LIMIT}$ is set to be invalid when the switching control signal is set to be valid.

The frequency limiting signal $F_{LIMIT}$ limits a frequency of the switching control signal Q. The switching cycle is larger than at least a time period of the invalid zone of the frequency limiting signal $F_{LIMIT}$, so that the output power at the light load decreases more rapidly.

Specifically, the frequency limiting signal generating circuit LIMIT includes voltage sources U6 and U7, a controlled voltage source U8, switches K4 and K5, a current source I2, a charging capacitor C2, a switch K6 and a comparator CMP4.

The voltage source U6 and the switch K4 are connected in series between an inverting input terminal of the comparator CMP4 and the ground. The voltage source U6 outputs a predetermined constant voltage. The switch K4 is controlled by a control signal V1, and is turned on when the voltage compensation voltage $V_{CMP}$ is within the first range, and is turned off when the voltage compensation signal $V_{CMP}$ is not within the first range.

The voltage source U7, the controlled voltage source U8 and the switch K5 are connected in series between an inverting input terminal of the comparator CMP4 and the ground. The voltage source U7 outputs a predetermined constant voltage, and the controlled voltage source U8 outputs a voltage proportional to the voltage compensation signal $V_{CMP}$. The switch K1 is controlled by a control signal V2, and is turned on when the voltage compensation voltage $V_{CMP}$ is within the second range, and is turned off when the voltage compensation signal $V_{CMP}$ is not within the second range.

The current source I2, the charging capacitor C2 and the switch K6 are connected in parallel between the non-inverting input terminal of the comparator CMP4 and the ground. The switch K6 maintains to be an on state for a predetermined time period, such as 100 ns, after the switching control signal Q is set to be valid. A one-shot circuit having an input terminal for receiving the switching control signal may be used for obtaining a control signal of the switch K6. The predetermined time period may be set to be a short time period so that the charging capacitor C2 is discharged completely. When the switch K6 is turned off, the current source I2 charges the charging capacitor C2 so that a voltage at the non-inverting terminal increases in a predetermined slope. When the switch K6 is turned on, two terminals of the charging capacitor C2 are shorted, and the charging capacitor C1 is discharged so that the voltage at the non-inverting terminal changes to be zero in a short time. Thus, the voltage at the non-inverting terminal increases after the power switch S is turned on, for example, after 100 ns, and reaches a threshold $V_F$ after a time period $T_{ON}$ so that the frequency limiting signal $F_{LIMIT}$ from the comparator CMP4 reverses. The invalid zone of the frequency limiting signal $F_{LIMIT}$ limits a minimum value of the switching cycle.

When the voltage compensation signal $V_{CMP}$ is within the first range, the switch K4 is turned on and the switch K5 is turned off. The threshold $V_F$ is a constant value. Thus, the time period corresponding to the invalid zone is constant.

When the voltage compensation signal $V_{CMP}$ is within the second range, the switch K5 is turned on and the switch K4 is turned off. The threshold $V_F$ is a parameter relevant to the voltage compensation signal $V_{CMP}$. Thus, the time period corresponding to the invalid zone varies with the voltage compensation signal $V_{CMP}$.

The set signal generating circuit SET generates a set signal when the frequency limiting signal $F_{LIMIT}$ is valid and a secondary-side current crosses zero. That is, the set signal is set to be valid at the time point.

Specifically, the set signal generating circuit SET includes an RS flip-flop RS1 and a logic gate AND2. The RS flip-flop RS1 has a reset terminal for receiving the switching control signal Q, a set terminal for receiving the frequency limiting signal $F_{LIMIT}$, and an output terminal which is connected to an input terminal of the logic gate AND2. The logic gate AND2 has another input terminal for receiving a zero-crossing detection signal $V_Z$. An output terminal of the logic gate AND2 provides a set signal $V_{SET}$. The logic gate AND2 is an AND gate. Nevertheless, one skilled in the art may change connections and use other types of logic gates in the set signal generating circuit, if signals are set to be valid at an opposite level. Moreover, the set signal generating circuit SET may be implemented by other types of circuits.

Figure 6:
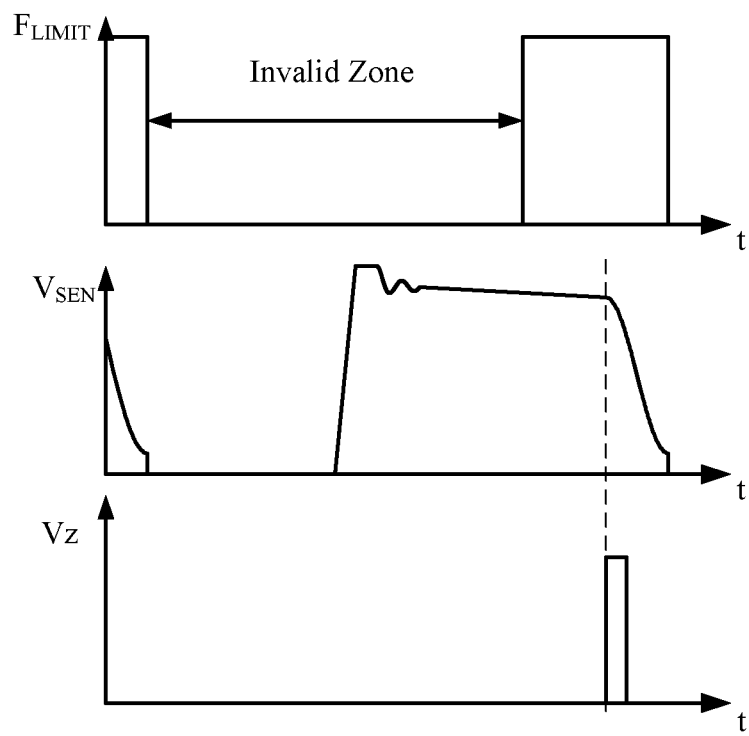
FIG. 6 is an operating waveform diagram in a specific condition of an example flyback converter according to one embodiment of the present disclosure.

FIG. 6 is an operating waveform diagram in a specific condition of an example flyback converter according to one embodiment of the present disclosure. As shown in FIG. 6, a sampling signal $V_{SEN}$ of an auxiliary winding is zero when the power switch S is turned on, fluctuates and then varies linearly when the power switch S is turned off. Finally, the sampling signal $V_{SEN}$ decrease rapidly after a secondary-side current crosses zero. Rapid decrease can be detected to obtain a time point when the secondary-side current crosses zero, which is a zero-crossing detection signal VZ. In FIG. 6, the frequency limiting signal $F_{LIMIT}$ has been set to be valid when the zero-crossing detection signal VZ provides an incoming pulse. That is, the current switching cycle has met the requirement of the frequency limiting signal. Thus, the first signal Va is set to be valid before the zero-crossing detection signal VZ provides the incoming pulse, and the set signal $V_{SET}$ is set to be valid accordingly. The power switch S is turned on at the moment. The RS flip-flop RS1 is reset after the switching control signal Q is set so that the set signal $V_{SET}$ provides a pulse at the moment.

Figure 7:
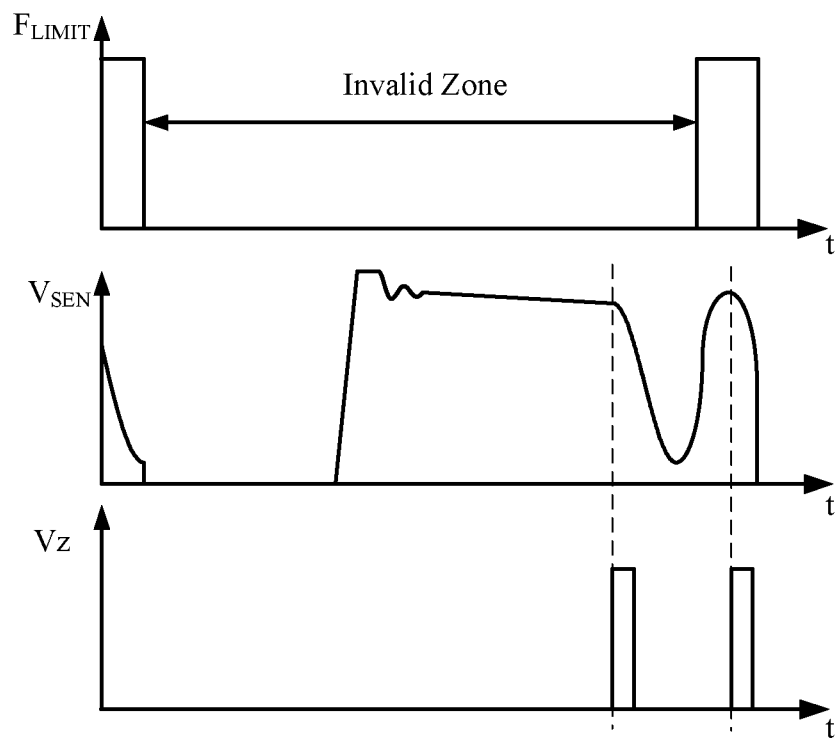
FIG. 7 is an operating waveform diagram in another specific condition of an example flyback converter according to one embodiment of the present disclosure.

FIG. 7 is an operating waveform diagram in another specific condition of an example flyback converter according to one embodiment of the present disclosure. As shown in FIG. 7, the frequency limiting signal $F_{LIMIT}$ is still in the invalid zone when the secondary-side current crosses zero for the first time, i.e. when the zero-crossing detection signal VZ provide a first pulse. In other words, the current switching cycle will not meet the requirement of the frequency limiting signal in a case that the switching control signal Q is set to be valid. Thus, the first signal Va is not set to be valid. A secondary-side current Is fluctuates after primary-side energy is exhausted. A voltage at the auxiliary winding fluctuates accordingly. The secondary-side current Is crosses zero for several times during fluctuation. Those time points of crossing zero may be detected by the voltage at the auxiliary winding. The RS flip-flop RS1 is not set until the frequency limiting signal $F_{LIMIT}$ is set to be valid, i.e. until the switching cycle meets the requirement of frequency limiting signal. After the moment, the logic circuit AND2 sets the set signal $V_{SET}$ to be valid (i.e. a high level) in a case that the zero-crossing detection signal is valid, i.e. in a case that the secondary-side current Is crosses zero intermittently. The power switch S is turned on at the moment accordingly. The RS flip-flop RS1 is reset after the switching control signal Q is set so that the set signal $V_{SET}$ provides a pulse at the moment.

The logic circuit LG sets the switching control signal Q to be valid in accordance with the set signal $V_{SET}$ and sets the switching control signal Q to be invalid in accordance with the reset signal $V_{RESET}$. The logic circuit LG may be an RS flip-flop.

Thus, the switching control signal Q may have a frequency below a predetermined frequency or a frequency which varies with the voltage compensation signal, by cooperation of the frequency limiting signal generating circuit and the set signal generating circuit, so that the output power decreases rapidly at the light load.

Figure 8:
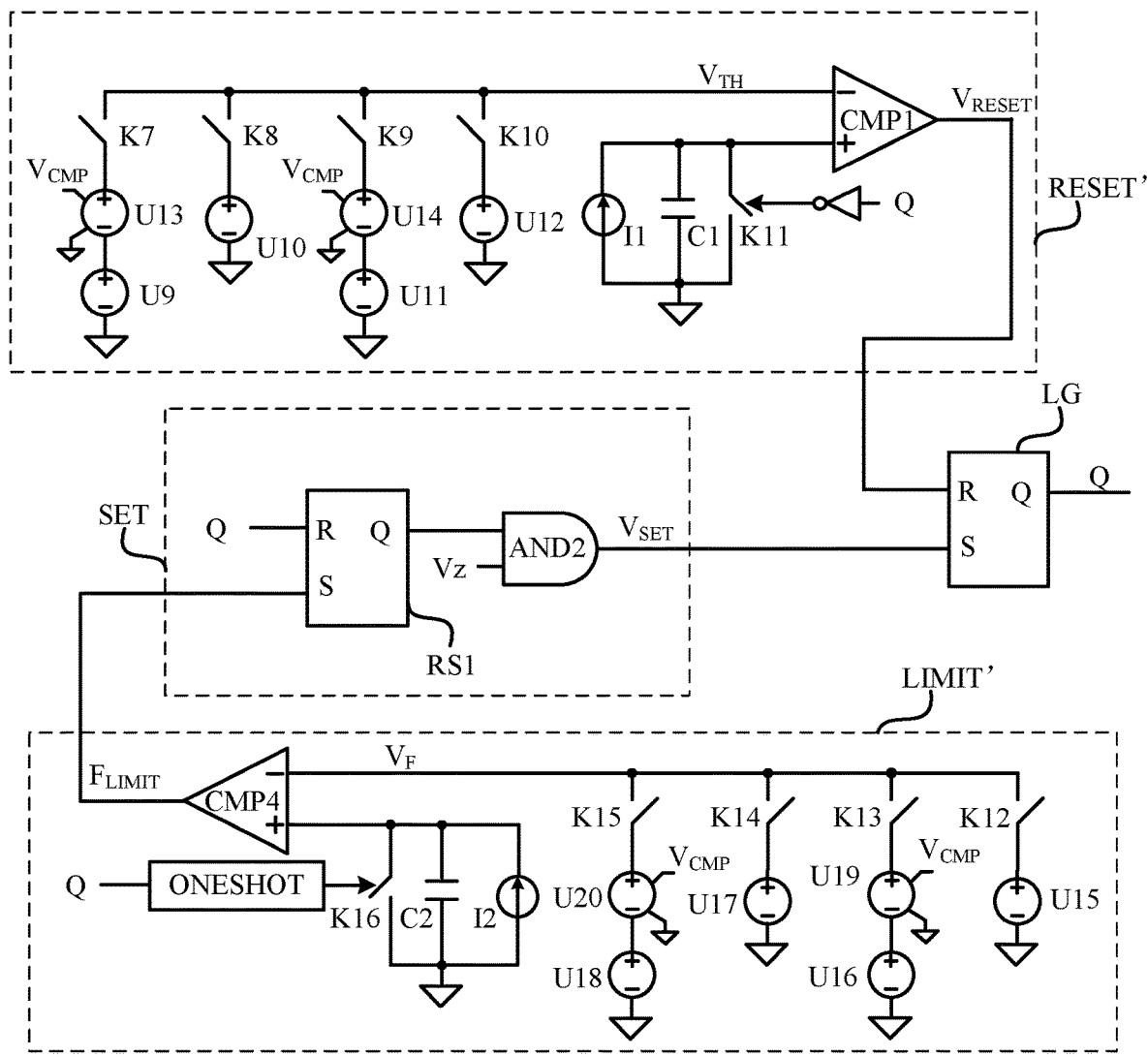
FIG. 8 is a schematic circuit diagram of a control signal generating circuit according to a second embodiment of the present disclosure.

FIG. 8 is a schematic circuit diagram of a second control signal generating circuit according to another embodiment of the present disclosure. In this embodiment, the control signal generating circuit 22 generates a switching control signal in a pulse width modulation mode in a case that the voltage compensation signal $V_{CMP}$ is within the first range, and generates a switching control signal in a constant on time mode in a case that the voltage compensation signal is within the second range, and further generates a switching control signal in a pulse width modulation mode in a case that the voltage compensation signal $V_{CMP}$ is within the third range, and generates a switching control signal in a constant on time mode in a case that the voltage compensation signal is within the fourth range. The first to fourth ranges are arranged from high to low. That is, the first range has a minimum value equal to a maximum value of the second range, the second range has a minimum value equal to a maximum value of the third range, the third range has a minimum value equal to a maximum value of the fourth range. In this embodiment, the control signal generating circuit 22 switches between two different modes for several times when the voltage compensation signal $V_{CMP}$ decreases. As mentioned above, the output power decreases rapidly in the pulse width modulation mode and varies slowly in the constant on time mode. Thus, the output power decreases rapidly at the light load, taking into account the efficiency, while the output voltage ripple decreases, by switching for several times.

As shown in FIG. 8, the control signal generating circuit includes a reset signal generating circuit RESET ', a frequency limiting signal generating circuit LIMIT', a set signal generating circuit SET and a logic circuit LG. The set signal generating circuit SET and the logic circuit LG are the same as those in the embodiment shown in FIG. 4, the details of which are not described below.

In FIG. 8, each of the reset signal generating circuit RESET and the frequency limiting signal generating circuit LIMIT has a threshold output portion including four sub-circuits which are connected in parallel.

Specifically, the reset signal generating circuit RESET' includes voltage sources U9 to U12, controlled voltage sources U13 to U14, switches K7 and K10, a current source I1, a charging capacitor C1, a switch K11 and a comparator CMP1.

The voltage source U9, the controlled voltage source U13 and the switch K7 are connected in series between an inverting input terminal of the comparator CMP1 and the ground. The voltage source U9 outputs a predetermined constant voltage, and the controlled voltage source U13 outputs a voltage proportional to the voltage compensation signal $V_{CMP}$. The switch K7 is controlled by the control signal V1', and is turned on when the voltage compensation voltage $V_{CMP}$ is within the first range, and is turned off when the voltage compensation signal $V_{CMP}$ is not within the first range. It should be understood that first range here only means that it is different from other voltage ranges, which may be a voltage range the same as or different from that in the above embodiment.

The control signal V1' may be generated by a condition detect circuit as shown in FIG. 5, which tells whether the voltage compensation signal $V_{CMP}$ is within the first range or not.

The voltage source U10 and the switch K8 are connected in series between an inverting input terminal of the comparator CMP1 and the ground. The voltage source U10 outputs a predetermined constant voltage. The switch K8 is controlled by a control signal V2', and is turned on when the voltage compensation voltage $V_{CMP}$ is within the second range, and is turned off when the voltage compensation signal $V_{CMP}$ is not within the second range. The control signal V2' may be generated by an independent condition detect circuit as shown in FIG. 5, with only introduction of voltage sources having different output voltages.

The voltage source U11, the controlled voltage source U14 and the switch K9 are connected in series between an inverting input terminal of the comparator CMP1 and the ground. The voltage source U11 outputs a predetermined constant voltage, and the controlled voltage source U14 outputs a voltage proportional to the voltage compensation signal $V_{CMP}$. The switch K9 is controlled by the control signal V3, and is turned on when the voltage compensation voltage $V_{CMP}$ is within the third range, and is turned off when the voltage compensation signal $V_{CMP}$ is not within the third range. The control signal V3 may be generated by an independent condition detection circuit as shown in FIG. 5, with only introduction of voltage sources having different output voltages.

The voltage source U12 and the switch K10 are connected in series between an inverting input terminal of the comparator CMP1 and the ground. The voltage source U12 outputs a predetermined constant voltage. The switch K10 is controlled by a control signal V4, and is turned on when the voltage compensation voltage $V_{CMP}$ is within the fourth range, and is turned off when the voltage compensation signal $V_{CMP}$ is not within the fourth range. The control signal V4 may be generated by an independent condition detect circuit as shown in FIG. 5, with only introduction of voltage sources having different output voltages.

The current source I1, the charging capacitor C1 and the switch K11 are connected in parallel between the non-inverting input terminal of the comparator CMP1 and the ground. The switch K11 are controlled to be turned on and off according to the inverting signal of the switching control signal Q, that is, the switch K11 is turned off as the power switch S is turned on, and is turned on as the power switch S is turned off. When the switch K11 is turned off, the current source I1 charges the charging capacitor C1 so that a voltage at the non-inverting terminal increases in a predetermined slope. When the switch K11 is turned on, two terminals of the charging capacitor C1 are shorted, and the charging capacitor C1 is discharged so that the voltage at the non-inverting terminal changes to be zero in a short time. Thus, the voltage at the non-inverting terminal increases when the power switch S is turned on, and reaches a threshold $V_{TH}$ after a time period $T_{ON}$ so that the reset signal $V_{RESET}$ from the comparator CMP1 reverses. The time period $T_{ON}$ is an on time period of the power switch S, which is a time period from a time point that the set signal $V_{SET}$ is set to be valid to a time point that the reset signal $V_{RESET}$ is set to be valid.

When the voltage compensation signal $V_{CMP}$ is within the first range, the switch K7 is turned on and the switches K8 to K10 are turned off. The threshold $V_{TH}$ is a parameter relevant to the voltage compensation signal $V_{CMP}$. Thus, the on time period $T_{ON}$ of the power switch varies with the voltage compensation signal $V_{CMP}$.

When the voltage compensation signal $V_{CMP}$ is within the second range, the switch K8 is turned on, and the switches K7, K9 and K10 are turned off. The threshold $V_{TH}$ is a constant value. Thus, the on time period $T_{ON}$ of the power switch is a constant first on time period T1.

When the voltage compensation signal $V_{CMP}$ is within the third range, the switch K9 is turned on and the switches K7 to K8 and K10 are turned off. The threshold $V_{TH}$ is a parameter relevant to the voltage compensation signal $V_{CMP}$. Thus, the on time period $T_{ON}$ of the power switch varies with the voltage compensation signal $V_{CMP}$.

When the voltage compensation signal $V_{CMP}$ is within the fourth range, the switch K10 is turned on, and the switches K7 to K9 are turned off. The threshold $V_{TH}$ is a constant value. Thus, the on time period $T_{ON}$ of the power switch is a constant second on time period T2.

The first on time period T1 is larger than the second on time period T2.

The frequency limiting signal generating circuit LIMIT' includes voltage sources U15 to U18, controlled voltage sources U19 and U20, switches K12 to K15, a current source I2, a charging capacitor C2, a switch K16 and a comparator CMP4.

The voltage source U15 and the switch K12 are connected in series between an inverting input terminal of the comparator CMP4 and the ground. The voltage source U15 outputs a predetermined constant voltage. The switch K12 is controlled by a control signal V1', and is turned on when the voltage compensation voltage $V_{CMP}$ is within the first range, and is turned off when the voltage compensation signal $V_{CMP}$ is not within the first range.

The voltage source U16, the controlled voltage source U19 and the switch K13 are connected in series between an inverting input terminal of the comparator CMP4 and the ground. The voltage source U16 outputs a predetermined constant voltage, and the controlled voltage source U19 outputs a voltage proportional to the voltage compensation signal $V_{CMP}$. The switch K13 is controlled by a control signal V2', and is turned on when the voltage compensation voltage $V_{CMP}$ is within the second range, and is turned off when the voltage compensation signal $V_{CMP}$ is not within the second range.

The voltage source U17 and the switch K14 are connected in series between an inverting input terminal of the comparator CMP4 and the ground. The voltage source U17 outputs a predetermined constant voltage. The switch K14 is controlled by a control signal V3, and is turned on when the voltage compensation voltage $V_{CMP}$ is within the third range, and is turned off when the voltage compensation signal $V_{CMP}$ is not within the third range.

The voltage source U18, the controlled voltage source U20 and the switch K15 are connected in series between an inverting input terminal of the comparator CMP4 and the ground. The voltage source U18 outputs a predetermined constant voltage, and the controlled voltage source U20 outputs a voltage proportional to the voltage compensation signal $V_{CMP}$. The switch K15 is controlled by a control signal V4, and is turned on when the voltage compensation voltage $V_{CMP}$ is within the fourth range, and is turned off when the voltage compensation signal $V_{CMP}$ is not within the fourth range.

The current source I2, the charging capacitor C2 and the switch K16 are connected in parallel between the non-inverting input terminal of the comparator CMP4 and the ground. The switch K16 maintains to be an on state for a predetermined time period, such as 100 ns as shown, after the switching control signal Q is set to be valid. The predetermined time period may be set to be a short time period so that the charging capacitor C2 is discharged completely. When the switch K16 is turned off, the current source I2 charges the charging capacitor C2 so that a voltage at the non-inverting terminal increases in a predetermined slope. When the switch K16 is turned on, two terminals of the charging capacitor C2 are shorted, and the charging capacitor C1 is discharged so that the voltage at the non-inverting terminal changes to be zero in a short time. Thus, the voltage at the non-inverting terminal increases after the power switch S is turned on, for example, after 100 ns, and reaches a threshold $V_F$ after a time period $T_{ON}$ so that the frequency limiting signal $F_{LIMIT}$ from the comparator CMP4 reverses. The invalid zone of the frequency limiting signal $F_{LIMIT}$ limits a minimum value of the switching cycle.

When the voltage compensation signal $V_{CMP}$ is within the first range, the switch K12 is turned on and the other switches are turned off. The threshold $V_F$ is a constant value. Thus, the time period corresponding to the invalid zone is constant, i.e. the first time period T1'.

When the voltage compensation signal $V_{CMP}$ is within the second range, the switch K13 is turned on and the other switches are turned off. The threshold $V_F$ is a parameter relevant to the voltage compensation signal $V_{CMP}$. Thus, the time period corresponding to the invalid zone varies with the voltage compensation signal $V_{CMP}$.

When the voltage compensation signal $V_{CMP}$ is within the third range, the switch K14 is turned on and the other switches are turned off. The threshold $V_F$ is a constant value. Thus, the time period corresponding to the invalid zone is constant, i.e. the second time period T2'.

When the voltage compensation signal $V_{CMP}$ is within the fourth range, the switch K15 is turned on and the other switches are turned off. The threshold $V_F$ is a parameter relevant to the voltage compensation signal $V_{CMP}$. Thus, the time period corresponding to the invalid zone varies with the voltage compensation signal $V_{CMP}$.

The first time period T1' is smaller than the second time period T2'. Due to the fact that the secondary-side current crosses zero soon after the end of the invalid zone, the frequency of the frequency limiting signal is larger in a case that the invalid zone has a first time period T1' than that in a case that the invalid zone has a second time period T2'.

Figure 9:
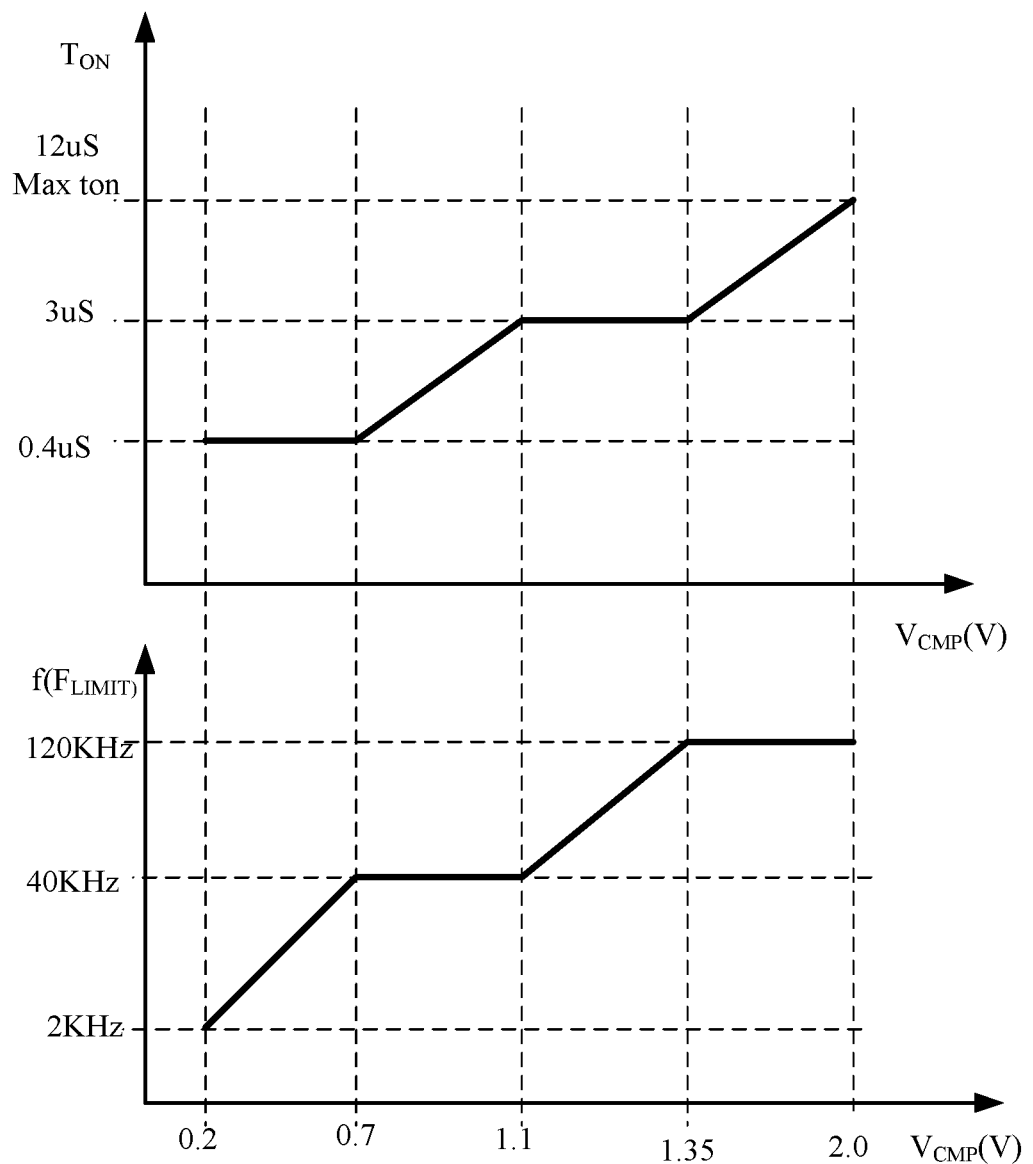
FIG. 9 shows variations of a reset signal and a frequency limiting signal with a voltage compensation signal according to an embodiment of the present disclosure.

FIG. 9 shows variations of a reset signal and a frequency limiting signal with a voltage compensation signal according to an embodiment of the present disclosure. As shown in FIG. 9, in a first range (for example, from 1.35V to 2.0V as shown in the figure), the switching control signal has an on time period $T_{ON}$ which varies with the voltage compensation signal $V_{CMP}$, while the frequency limiting signal $F_{LIMIT}$ has a constant value. Thus, the control signal generating circuit 22 operates in a pulse width modulation mode. In a second range (for example, from 1.1V to 1.35V as shown in the figure), the switching control signal has an on time period $T_{ON}$ which has a constant value, while the frequency limiting signal $F_{LIMIT}$ varies with the voltage compensation signal $V_{CMP}$. Thus, the control signal generating circuit 22 operates in a constant on time mode. In a third range (for example, from 0.7V to 1.1V as shown in the figure), the switching control signal has an on time period $T_{ON}$ which varies with the voltage compensation signal $V_{CMP}$, while the frequency limiting signal $F_{LIMIT}$ has a constant value being relatively small. Thus, the control signal generating circuit 22 operates in a pulse width modulation mode. In a fourth range (for example, from 0.2V to 0.7V as shown in the figure), the switching control signal has an on time period $T_{ON}$ which has a constant value being relatively small, while the frequency limiting signal $F_{LIMIT}$ varies with the voltage compensation signal $V_{CMP}$. Thus, the control signal generating circuit 22 operates in a constant on time mode. The voltage sources are configured to have desired values, such as the same one for the voltage sources U11 and U12, and the same one for the voltage sources U9 and U10, so that the switching control signal Q has an on time period $T_{ON}$ which varies smoothly with the voltage compensation signal $V_{CMP}$.

That is, the on time period $T_{ON}$ has a minimum value in a previous range the same as a maximum value in a next range. Similarly, the frequency limiting signal has a frequency which varies smoothly with the voltage compensation signal $V_{CMP}$ by using voltage sources configured to have desired values.

Thus, the difference modes may be switched smoothly, with adverse effect on parameters of the power stage circuit to be minimized.

Figure 10:
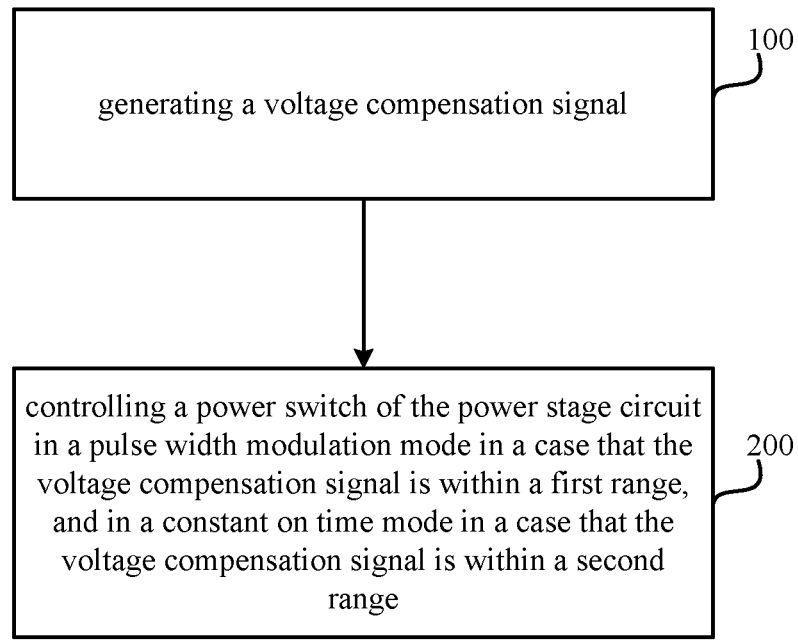
FIG. 10 is a flow chart of an example control method according to an embodiment of the present disclosure.

FIG. 10 is a flow chart of an example control method according to an embodiment of the present disclosure. As shown in FIG. 10, the control method for controlling a power stage circuit of a flyback converter at a light load, comprising:

step 100, generating a voltage compensation signal which represents a difference between an output voltage of the power stage circuit and a reference voltage;

step 200: controlling a power switch of the power stage circuit in a pulse width modulation mode in a case that the voltage compensation signal is within a first range, and in a constant on time mode in a case that the voltage compensation signal is within a second range.

A minimum value of the first range is equal to a maximum value of the second range.

Preferably, the method comprises controlling the power switch in a pulse width modulation mode in a case that the voltage compensation signal is within a third range, and in a constant on time mode in a case that the voltage compensation signal is within a fourth range. A maximum value of the third range is equal to a minimum value of the second range, and a maximum value of the fourth range is equal to a minimum value of the third range.

Preferably, the switching control signal which is generated in a case that the voltage compensation signal is within the second range has a first on time period, and the switching control signal which is generated in a case that the voltage compensation signal is within the fourth range corresponds to a second on time period, and the first on time period is larger than the second on time period.

The frequency limiting signal which is generated in a case that the voltage compensation signal is within the first range has an invalid zone with a first time period, and the frequency limiting signal which is generated in a case that the voltage compensation signal is within the third range has an invalid zone with a second time period, and the first time period is smaller than the second time period. The switching control signal is used for controlling the power switch, and the frequency limiting signal is used for controlling switching cycle of the switching control signal.

In this embodiment, a power stage circuit is controlled at a light load to operate alternatively in a pulse width modulation mode (i.e. a constant switching frequency mode) and in a constant on time mode, in accordance with a voltage compensation signal. Thus, output energy may decrease rapidly and smoothly, without need for the control circuit to stop working. The flyback converter has increased efficiency at the light load and decreased output voltage ripple.

Figure 11:
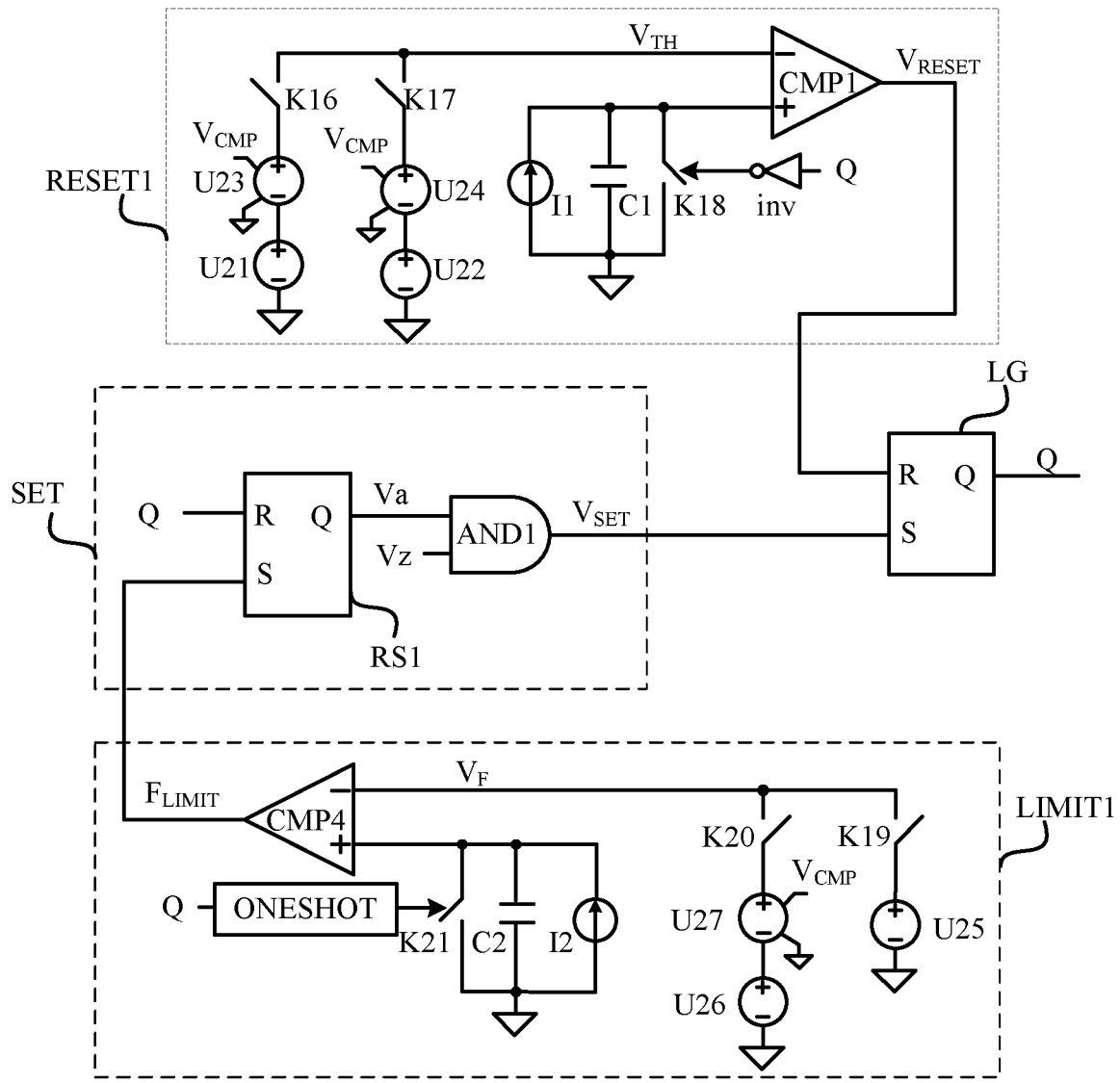
FIG. 11 is a schematic circuit diagram of a control signal generating circuit according to a third embodiment of the present disclosure.

FIG. 11 is a schematic circuit diagram of a third control signal generating circuit according to the third embodiment of the present disclosure. In this particular example, control signal generating circuit 22 can generate the switching control signal Q in a pulse width modulation mode when voltage compensation signal $V_{CMP}$ is within the first range, and can generate switching control signal Q in a mixed modulation mode when voltage compensation signal $V_{CMP}$ is within the second range. The first to second ranges can be arranged from high to low. That is, the first range may have a minimum value equal to a maximum value of the second range.

As shown in FIG. 11, the control signal generating circuit can include reset signal generating circuit RESET1, frequency limiting signal generating circuit LIMIT 1, set signal generating circuit SET, and logic circuit LG. The set signal generating circuit SET and logic circuit LG may be the same as those discussed above with respect to FIG. 4.

In FIG. 11, each of reset signal generating circuit RESET1 and frequency limiting signal generating circuit LIMIT1 may have a threshold output portion including two sub-circuits that are connected in parallel.

For example, reset signal generating circuit RESET1 can include voltage sources U21 and U22, controlled voltage sources U23 and U24, switches K16 and K17, current source I1, charging capacitor C1, switch K18, and comparator CMP1.

Voltage source U21, controlled voltage source U23, and switch K16 can connect in series between an inverting input terminal of comparator CMP1 and ground. Voltage source U21 can output a predetermined constant voltage, and controlled voltage source U23 may output a voltage proportional to voltage compensation signal $V_{CMP}$. Switch K16 can be controlled by control signal V11, and may be turned on when voltage compensation voltage $V_{CMP}$ is within the first range, and turned off when voltage compensation signal $V_{CMP}$ is not within the first range. It should be understood that first range here can mean that it is different from other voltage ranges, which may be a voltage range the same as or different from that in the above example.

Control signal V11 may be generated by a condition detect circuit as shown in FIG. 5, which can indicate whether voltage compensation signal $V_{CMP}$ is within the first range or not.

Voltage source U22, controlled voltage sources U24, and switch K17 can connect in series between an inverting input terminal of comparator CMP1 and ground. Voltage source U22 may output a predetermined constant voltage. Switch K17 can be controlled by control signal V21, and can be turned on when voltage compensation voltage $V_{CMP}$ is within the second range, and turned off when voltage compensation signal $V_{CMP}$ is not within the second range. Control signal V21 may be generated by an independent condition detect circuit as shown in FIG. 5, with additional voltage sources having different output voltages.

Current source I1, charging capacitor C1, and switch K18 can connect in parallel between the non-inverting input terminal of comparator CMP1 and ground. Switch K18 can be controlled to be turned on and off according to the inverting signal of switching control signal Q; that is, switch K18 can be turned off as power switch S is turned on, and turned on as power switch S is turned off. When switch K18 is turned off, current source I1 can charge charging capacitor C1 such that a first voltage at the non-inverting terminal increases at a predetermined slope. When switch K18 is turned on, two terminals of charging capacitor C1 may be shorted, and charging capacitor C1 can be discharged such that the first voltage at the non-inverting terminal changes to be zero in a relatively short time. Thus, the first voltage can increase when power switch S is turned on, and may reach threshold $V_{TH}$ after time period $T_{ON}$ such that reset signal $V_{RESET}$ from comparator CMP1 transitions. The time period $T_{ON}$ can be an on time period of power switch S, which is a time period from a time point that set signal $V_{SET}$ is set to be active/valid to a time point that reset signal $V_{RESET}$ is set to be inactive/invalid.

When voltage compensation signal $V_{CMP}$ is within the first range, switch K16 can be turned on and switches K17 turned off. The threshold $V_{TH}$ can be a parameter relevant to voltage compensation signal $V_{CMP}$. Thus, on time period $T_{ON}$ of the power switch may vary along with voltage compensation signal $V_{CMP}$.

When voltage compensation signal $V_{CMP}$ is within the second range, switch K17 can be turned on, and switches K16 turned off. The threshold $V_{TH}$ may also be a parameter relevant to voltage compensation signal $V_{CMP}$. Thus, the on time period $T_{ON}$ of the power switch can vary along with the voltage compensation signal $V_{CMP}$.

The frequency limiting signal generating circuit LIMIT1 can include voltage sources U25 and U26, controlled voltage sources U27, switches K19 and K20, current source I2, charging capacitor C2, switch K21, and comparator CMP4.

The voltage source U25 and switch K19 can connect in series between an inverting input terminal of comparator CMP4 and ground. The voltage source U25 can output a predetermined constant voltage. The switch K19 can be controlled by control signal V11, and may be turned on when voltage compensation voltage $V_{CMP}$ is within the first range, and turned off when voltage compensation signal $V_{CMP}$ is not within the first range.

The voltage source U26, controlled voltage source U27, and switch K20 can connect in series between an inverting input terminal of comparator CMP4 and ground. The voltage source U26 may output a predetermined constant voltage, and controlled voltage source U27 can output a voltage proportional to voltage compensation signal $V_{CMP}$. The switch K20 may be controlled by control signal V21, and turned on when voltage compensation voltage $V_{CMP}$ is within the second range, and turned off when voltage compensation signal $V_{CMP}$ is not within the second range.

The current source I2, charging capacitor C2, and switch K21 can connect in parallel between the non-inverting input terminal of comparator CMP4 and ground. The switch K21 may be maintained in an on state for a predetermined time period, such as 100 ns as shown, after switching control signal Q is set to be valid. The predetermined time period may be set to be a short time period so that charging capacitor C2 is discharged completely. When switch K21 is turned off, current source I2 can charge the charging capacitor C2 such that a second voltage at the non-inverting terminal increases in a predetermined slope. When switch K21 is turned on, two terminals of charging capacitor C2 may be shorted, and charging capacitor C1 can be discharged such that the second voltage at the non-inverting terminal changes to be zero in a short time. Thus, the second voltage at the non-inverting terminal increases after power switch S is turned on, e.g., after 100 ns, and reaches threshold $V_F$ after a time period so that frequency limiting signal $F_{LIMIT}$ from comparator CMP4 transitions. The invalid zone of frequency limiting signal $F_{LIMIT}$ may limit a minimum value of the switching cycle.

When voltage compensation signal $V_{CMP}$ is within the first range, switch K19 can be turned on and switch K20 turned off. The threshold $V_F$ can be a constant value. Thus, the time period corresponding to the invalid zone may be constant, and the switching cycle also constant.

When voltage compensation signal $V_{CMP}$ is within the second range, switch K20 can be turned on and switch K19 turned off. The threshold $V_F$ may be a parameter relevant to voltage compensation signal $V_{CMP}$. Thus, the time period corresponding to the invalid zone can vary along with voltage compensation signal $V_{CMP}$.

In another example, control signal generating circuit 22 may also generate a switching control signal when voltage compensation signal $V_{CMP}$ is within the third range, and the second range has a minimum value equal to a maximum value of the third range. For example, each of reset signal generating circuit RESET1 and frequency limiting signal generating circuit LIMIT1 may add a threshold output portion connected in parallel in FIG. 11.

When voltage compensation signal $V_{CMP}$ is within the third range, threshold $V_{TH}$ and threshold $V_F$ may be constant and set at minimum values. In this way, on time period $T_{ON}$ and the switching cycle of the power switch are constant, so that the power stage may output less power to maintain the load operating.

Figure 12:
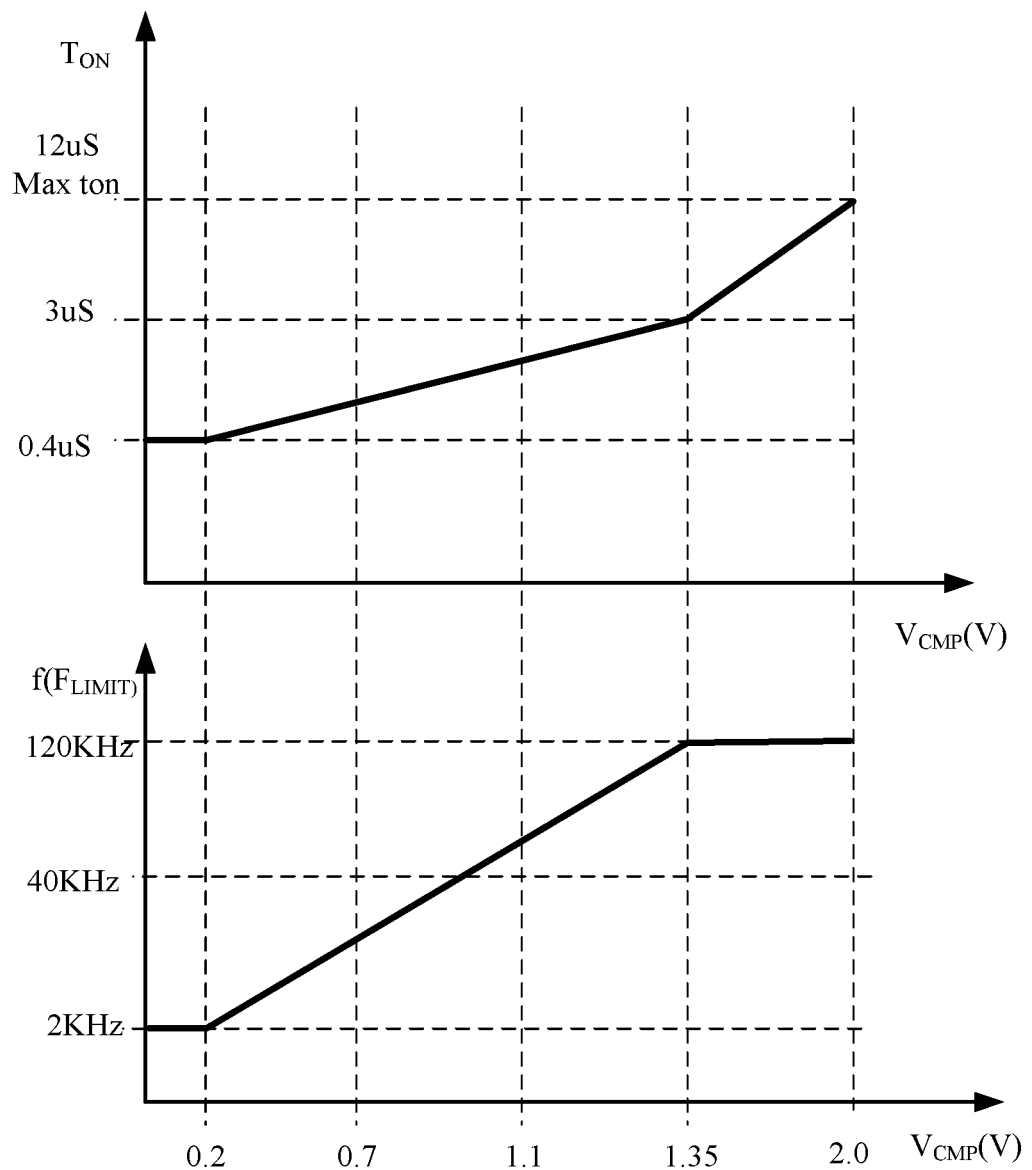
FIG. 12 shows variations of an on time period and a frequency limiting signal with a voltage compensation signal according to an embodiment of the present disclosure.

FIG. 12 shows variations of an on time period and a frequency limiting signal with a voltage compensation signal according to an embodiment of the present disclosure.

As shown in FIG. 12, in a first range (e.g., from 1.35V to 2.0V as shown in the figure), the switching control signal may have an on time period $T_{ON}$ that varies along with voltage compensation signal $V_{CMP}$, while frequency limiting signal $F_{LIMIT}$ has a constant value. Thus, control signal generating circuit 22 may operate in a pulse-width modulation mode. In a second range (e.g., from 0.2V to 1.35V as shown in the figure), the switching control signal may have an on time period $T_{ON}$ that varies along with voltage compensation signal $V_{CMP}$, while frequency limiting signal $F_{LIMIT}$ varies along with voltage compensation signal $V_{CMP}$. Thus, control signal generating circuit 22 may operate in a mixed modulation mode. In a third range (e.g., from 0V to 0.2V as shown in the figure), the switching control signal may have an on time period $T_{ON}$ that has a constant value that is relatively small, while frequency limiting signal $F_{LIMIT}$ has a constant value that is relatively small. Thus, control signal generating circuit 22 may operate in a constant on-time and switching cycle mode.

In addition, the voltage sources may have desired values, such as the same one for voltage sources U21 and U22, and the same one for voltage sources U25 and U26, such that switching control signal Q has an on time period $T_{ON}$ that varies smoothly along with voltage compensation signal $V_{CMP}$. That is, on time period $T_{ON}$ may have a minimum value in a previous range that is the same as a maximum value in a next range. Similarly, the frequency limiting signal may have a frequency that varies smoothly along with voltage compensation signal $V_{CMP}$ by using voltage sources configured to have desired values. Thus, the difference modes may be switched relatively smoothly, with adverse effect on parameters of the power stage circuit substantially minimized Even when voltage compensation signal $V_{CMP}$ decreases slightly, the output energy may decrease greatly. That is, the output energy may be proportional to the square of on time period $T_{ON}$ of the power switch, and can vary nearly linearly with the switching cycle of the power switch. In this way, the output energy may vary with the cube of the voltage compensation signal when the voltage compensation signal is within the second range while the on time period $T_{ON}$ and the switching cycle of the power switch can vary nearly linearly with voltage compensation signal $V_{CMP}$. After the output power is adjusted rapidly, the power stage may output less power, in order to increase efficiency at a relatively light load. Thus, three modes may be operated at different ranges of voltage compensation signal $V_{CMP}$ in order to maintain efficiency at a light load condition while performing rapid adjustment of the output power, without the need for a typical control method that has a large output voltage ripple.

The foregoing descriptions of specific embodiments of the present invention have been presented, but are not intended to limit the invention to the precise forms disclosed. It will be readily apparent to one skilled in the art that many modifications and changes may be made in the present invention. Any modifications, equivalence, variations of the preferred embodiments can be made without departing from the doctrine and spirit of the present invention.

What is claimed is:

1. A control circuit for controlling a power stage circuit of a flyback converter, the control circuit comprising:
    a compensation circuit configured to generate a voltage compensation signal which represents a difference between an output voltage of said power stage circuit and a reference voltage;
    a control signal generating circuit configured to generate a switching control signal for controlling a power switch of said power stage circuit in accordance with said voltage compensation signal; and
    wherein only at a light load condition, said switching control signal is configured to adjust a switching cycle and an on time period of said power switch in accordance with said voltage compensation signal, in order to control said power stage circuit to operate continuously to decrease an energy delivered to a secondary side of said flyback converter.

2. The control circuit according to claim 1, wherein said on time of said power switch is decreased correspondingly with the decrease of said voltage compensation signal.

3. The control circuit according to claim 2, wherein said switching cycle of said power switch is decreased correspondingly with the decrease of said voltage compensation signal.

4. The control circuit according to claim 1, wherein said switching cycle and said on time period of said power switch is decreased correspondingly with the decrease of said voltage compensation signal synchronously.

5. The control circuit according to claim 1, wherein said switching cycle and said on time period of said power switch is decreased correspondingly with the decrease of said voltage compensation signal asynchronously.

6. The control circuit according to claim 1, wherein said switching cycle of said power switch is constant and said on time period of said power switch varies along with said voltage compensation signal when said voltage compensation signal is within a first range; and
    said switching cycle of said power switch varies along with said voltage compensation signal and said on time period of said power switch is constant when said voltage compensation signal is within a second range, wherein a minimum value of said first range is equal to a maximum value of said second range.

7. The control circuit according to claim 6, wherein said switching cycle of said power switch is constant and said on time period of said power switch varies along with said voltage compensation signal when said voltage compensation signal is within a third range.

8. The control circuit according to claim 6, wherein an output energy of said power stage circuit varies with a square of said voltage compensation signal when said voltage compensation signal is within said first range, and varies linearly with said voltage compensation signal when said voltage compensation signal is within said second range.

9. The control circuit according to claim 6, wherein said on time period is a time period during which a first voltage increases from zero to a first threshold when said voltage compensation signal is within said first range, and said first threshold varies along with said voltage compensation signal.

10. The control circuit according to claim 9, wherein said switching cycle is greater than a predetermined invalid zone of a frequency limiting signal, and said predetermined invalid zone is a time period during which a second voltage increases from zero to a second threshold varying along with said voltage compensation signal when said voltage compensation signal is within a second range.

11. The control circuit according to claim 1, wherein said switching cycle of said power switch is constant and said on time period of said power switch varies along with said voltage compensation signal when said voltage compensation signal is within a first range; and said switching cycle and said on time period of said power switch varies along with said voltage compensation signal synchronously when said voltage compensation signal is within said a second range.

12. The control circuit according to claim 11, wherein said switching cycle and said on time period of said power switch is set at minimum values when said voltage compensation signal is within a third range.

13. The control circuit according to claim 11, wherein an output energy of said power stage circuit varies with the cube of said voltage compensation signal when said voltage compensation signal is within said second range.

14. The flyback converter, comprising:
the power stage; and
the control circuit according to claim 1.

15. A method of controlling a power stage circuit of a flyback converter, the method comprising:
generating a voltage compensation signal which represents a difference between an output voltage of said power stage circuit and a reference voltage;
generating a switching control signal for controlling a power switch of said power stage circuit in accordance with said voltage compensation signal; and
only at a light load condition, adjusting an on time period and a switching cycle of said power switch by said switching control signal in accordance with said voltage compensation signal to control said power stage circuit to operate continuously to decrease an energy delivered to a secondary side of said flyback converter.

16. The method according to claim 15, further comprising adjusting said switching cycle and said on time period to decrease correspondingly along with the decrease of said voltage compensation signal synchronously.

17. The method according to claim 15, further comprising adjusting said switching cycle and said on time period to decrease correspondingly along with the decrease of said voltage compensation signal asynchronously.

18. The method according to claim 15, further comprising:
adjusting said switching cycle to be constant and said on time period to vary along with said voltage compensation signal when said voltage compensation signal is within a first range; and
adjusting said switching cycle and said on time period to vary along with said voltage compensation signal synchronously when said voltage compensation signal is within a second range.

19. The method according to claim 18, further comprising adjusting said switching cycle and said on time period to be minimum values when said voltage compensation signal is within a third range.

* * * * *